Nov. 28, 1939.   C. A. REIMSCHISSEL   2,181,343
TUBULAR JOINT SEAL
Filed Nov. 6, 1937   3 Sheets-Sheet 1
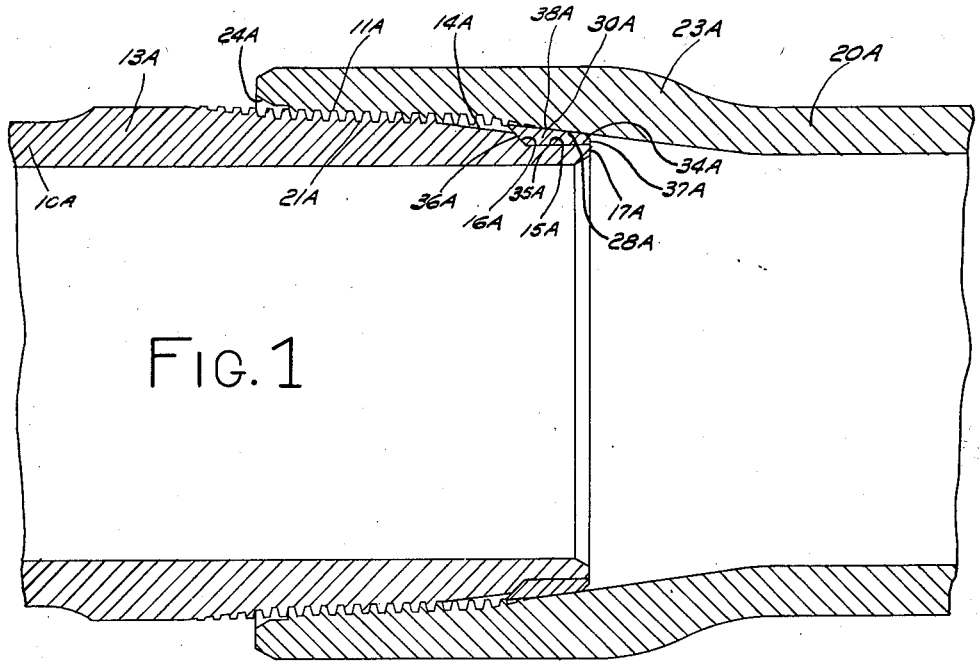
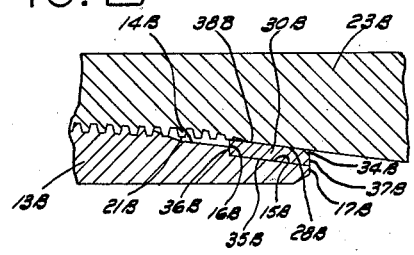
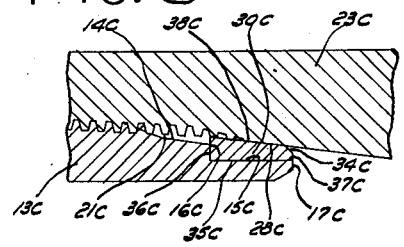
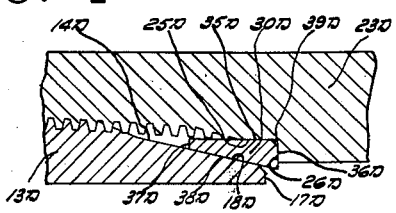
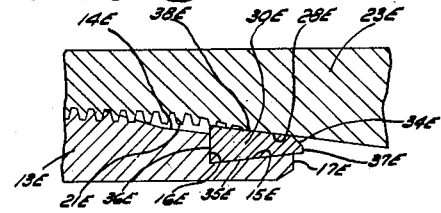
INVENTOR.
Charles A. Reimschissel
BY
Hugh N Rocks
ATTORNEY.

Nov. 28, 1939.  C. A. REIMSCHISSEL  2,181,343
TUBULAR JOINT SEAL
Filed Nov. 6, 1937  3 Sheets—Sheet 2
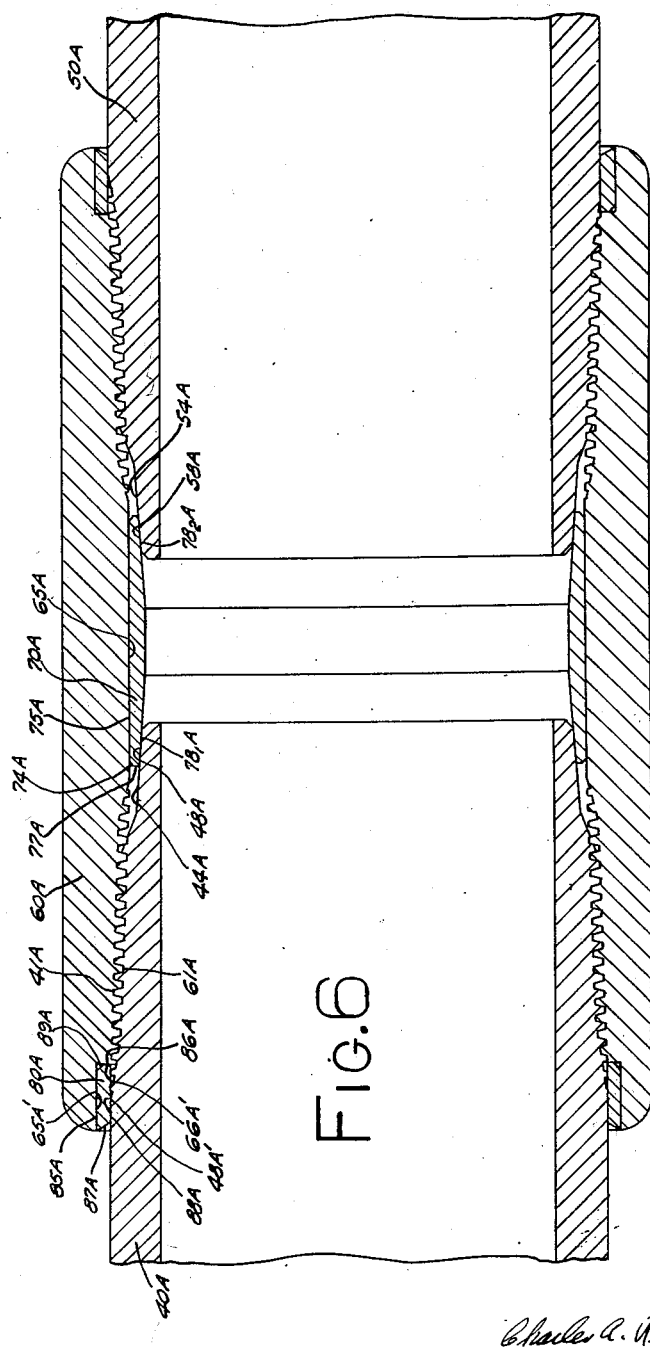
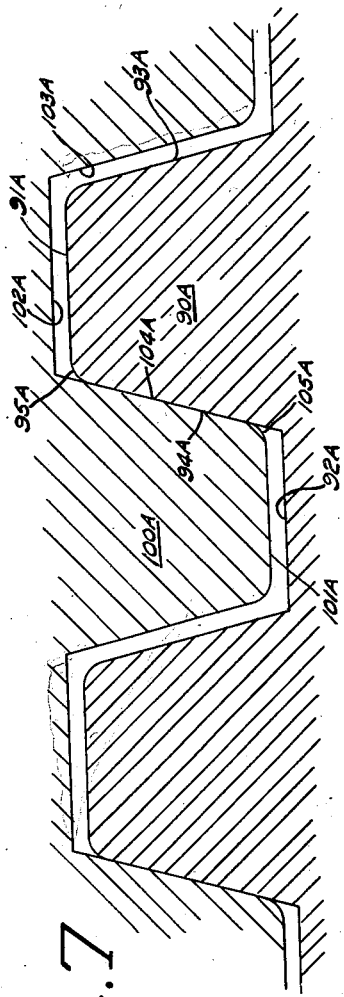
Charles A. Reimschissel INVENTOR.
BY
Hugh N. Ricks
ATTORNEY.

Nov. 28, 1939.   C. A. REIMSCHISSEL   2,181,343
TUBULAR JOINT SEAL
Filed Nov. 6, 1937   3 Sheets-Sheet 3

Charles A. Reimschissel INVENTOR.
BY
Hugh M. Ricks
ATTORNEY.

Patented Nov. 28, 1939

2,181,343

UNITED STATES PATENT OFFICE 2,181,343

TUBULAR JOINT SEAL

Charles A. Reimschissel, Waynesboro, Pa.

Application November 6, 1937, Serial No. 173,059

6 Claims. (Cl. 285—146)

This invention relates to improvements in metallic pipe joint seals suitable for use in tubular products subjected to high stresses and refers more particularly to metallic seals for threaded pipe such as is used in oil wells, etc. The invention differs from the prior art in that the threaded members are not intended to perform any sealing function and in that a peripheral seal shall be effected by the introduction of a metallic ring which is preferably made of a material other than that which is used to form the pipe members.

In the various applications of pipe suitable for high pressures, there have always been two factors which the trade has considered paramount: first, the sealing function shall be as perfect as is possible lest the extruding fluid, by its abrasive action, cause a relatively small leak to develope into a relatively large one and thereby cut and ruin the pipe; and, second, when the members are united by their threaded sections, localized heating of the threaded elements is to be avoided lest the threads "gall" and thereby cause the pipe to be unfit for future applications.

It is the primary object of this invention to provide a metallic pipe joint seal which is not located on the threaded sections of such a joint and is, therefore, independent of the direct forces exerted on and by the threads of such sections.

It is another major object to provide a peripheral pipe joint seal whose metal will "creep" into the surface irregularities of the coacting surfaces of the sealed members and will, therefore, effect a perfect seal. And, conversely, the seal may be of such a metal that the softer tubular member metal will "creep" into the surface irregularities of the seal and thereby effect a perfect seal.

It is a further major object to provide a metallic pipe joint seal which will not be appreciably influenced by any reversal of stresses in the pipe members or by any temperature change usually encountered by the said seal.

It is a further object to provide a metallic seal which will automatically position itself as the sealing force is applied, thereby, minimizing any possibility of misalignment of the said seal.

It is a further object to provide several combinations of seals and thread forms so that a rigid pipe joint can be effected in various desirable ways.

It is a further object to provide a peripheral metallic seal so formed that the seal is not damaged when it is being inserted into the proper pipe member, this being effected by the use of beveled entrance edges on the seal proper.

It is a further object to provide a sealing arrangement wherein a high tensile seal will coact with surfaces on male tubular members and will "float" within a female coupling member, the seal being preferably preloaded; that is, the seal will be initially stressed, after being positioned on its respective tubular member, so that the deforming forces, to which the seal will subsequently be subjected, will act in opposition to the said initial stresses set up by the preloading of the seal; or the seal dimensions are such that the tubular walls in contact with the sealing sides of the seal member are stressed before any appreciable locking engagement of the threaded sections of the tubular members is effected.

It is a further object to provide various thread forms which are designed to minimize the "galling" of the threads so that the pipe can be recovered for use in future applications. This is an important development, for the cost of rethreading "galled" tubing is often a very large one.

It is a further object to provide various thread forms which are not very susceptible to damage which might be incurred by ordinary thread forms.

It is a further object to provide several sealing arrangements using a multiplicity of seals so that the entire sealing arrangement is conducive to maintaining a perfect seal regardless of the types of stresses imposed upon the individual seals of the multiple sealing arrangement.

Other objects of the invention will become apparent as the specification proceeds. The preferred constructions are set forth in the accompanying drawings which are made a part hereof and in which similar reference characters denote similar parts in all the views:

Figure 1 being a cross-sectional view of one of the preferred types of seal suitable for threaded upset tubing or similar tubular members.

Figure 2 being a sectional view of a modified type of seal similar to the one illustrated in Figure 1.

Figure 3 being a sectional view of another modified type of seal similar to the one illustrated in Figure 1.

Figure 4 being a sectional view of further modified type of seal such as is illustrated in Figure 1.

Figure 5 being a sectional view of a still further modified type of seal such as is illustrated in Figure 1.

Figure 6 being a cross-sectional view of one of the preferred types of seals suitable for pipe couplings, etc.

Figure 7 being a profile sectional view of a preferred thread form.

Figure 8 being a sectional view of a multiple sealing arrangement applied to upset tubular members similar to those shown in Figure 1.

Figure 9 being a sectional view of a modified type of seal similar to the one shown in Figure 6.

Figure 10 being a sectional view of a further modified type of seal similar to the one shown in Figure 6, the seal being preferably pre-loaded.

Figure 11 being a profile sectional view of another preferred thread form somewhat similar to the thread form shown in Figure 7.

Although the drawings show many different types of seals, all are basically the same. The five seals especially suitable for use in upset tubing are given the numbers 30A, 30B, 30C, 30D, and 30E. The upset tubular member whose male end is coacting with one of the above seals is assigned the number 10 plus the letter referring to the particular seal. The upset tubular member whose female end is coacting with the same seal is given the number 20 plus the letter applicable to the seal. The three seals generally used with couplings are given the numbers 70A, 70B, and 70C. The coupling member used with the seal is given the number 60 plus the letter of the particular seal used in conjunction with it and the two pipe members. These two pipe members are assigned the basic numbers 40 and 50 and are further qualified by the applicable seal letter. Peripheral end seals are assigned the number 80, when used on couplings; this number is primed if the seal is used on or with upset tubular members. In addition, if an end seal is used in conjunction with one of the above mentioned seals, it is also assigned the letter applicable to that seal.

Finally, in seals for upset tubular members, since the seal must first be placed in or on one of the said members, the seal side which later effects a seal with the member in or on which the seal was initially positioned is given the digit 5 for a unit; the seal side which co-operates to effect a seal with the other upset tubular member is given the digit 8 for a unit; the side which abuts an axially positioning section of the tubular member in or on which the seal was placed is given the digit 6 for a unit; and the remaining seal side is given the digit 7 for a unit; this side being at the seal end through which the second tubular member enters the seal; consequently, it is always opposite side 6.

The unit digits used to signify the sides of seals suitable for upset tubing are also applicable to designate corresponding sides of end seals and seals suitable for couplings. However, in the latter, since there are two pipe members, certain of the seal sides are duplicated; therefore, the digits 1 and 2 are applied as subnumbers to further clarify the particular distinction. Subnumber 1 is applied to a seal surface coacting with male member 40, while subnumber 2 is applied to a corresponding seal surface coacting with male member 50. In addition to the various seals, two thread forms, A and B, are shown. The basic number 90 referring to the male thread, while the basic number 100 refers to the female thread.

This method of numbering is primarily intended to appreciably reduce the amount of descriptive matter to explain the various features of the illustrated seals. By its use, it is believed that a better conception of the scope of the invention can be obtained.

Referring to Figure 1, the male or casing end of a pipe 10A is joined by a threaded section to the female or coupling end of a pipe 20A which is usually the duplicate of pipe 10A. The threads 11A are externally threaded on the upset portion 13A of pipe end 10A, while the threads 21A are internally threaded in the upset portion 23A of the pipe 20A. These threads are tapered, but they need not necessarily be so designed. The pipe edge 24A of pipe end 20A is beveled so as to aid in "stabbing" or locating the leading edge 14A of the pipe end 10A.

The pipe end 10A is provided with an annular recessed groove at the leading edge. This groove has a side 15A parallel to the axis of the pipe and a side 16A inclined at some angle to the pipe axis and intersecting the leading edge 14A of the pipe end 10A.

Before the members 10A and 20A are threaded together, a metallic ring 30A is placed in the recessed groove of the pipe end 10A so that the side 35A of the ring 30A is in firm contact with the side 15A of the pipe end 10A, and the side 36A is in firm contact with the side 16A of the pipe end 10A. The ring 30A is so constructed that when this occurs, the side 37A is in the same plane, or is flush with, the end 17A of the pipe end 10A; however, this need not necessarily be so. The ring 30A is also provided with a beveled edge 34A to prevent damage to the ring and especially to the side 38A which coacts with the surface 28A of the coupling end 20A. The taper of this coupling end surface is equal to or preferably slightly greater than the taper of the threaded section.

Figure 2 shows a modified type of seal which is similar to that of Figure 1 except that the sides 35B and 15B are inclined at the same angle to the pipe axis as are the sides 38B and 28B; however, they may be inclined at some smaller angle. Also, the sides 36B and 16B are now perpendicular to the pipe axis instead of being inclined to it.

Figure 3 shows a modified type of seal which is similar to that of Figure 1; however, sides 36C and 16C are now shown as being parallel to the end 17C of the pipe, or which end is perpendicular to the pipe axis.

Figure 9:
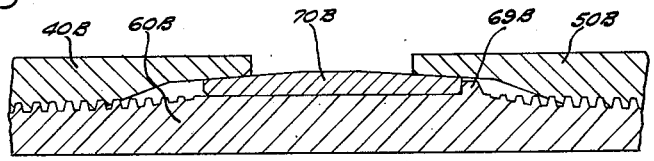

Figure 4 shows a modified type of seal which is similar to that shown in Figure 3; however, seal sides "5" and "6" are now located on the member 23D, with coacting pipe sides being termed 25D and 26D, the seal sides being fully referred to as 35D and 36D. Seal side "8" is now located on the member 13D, with the coacting pipe side being referred to as 18D, while the seal side is fully referred to as side 38D. Thus, with respect to the seal of Figure 1, this seal has actually had its coacting sides transferred from one tubular member to the other. A bevel is placed on the pipe edge 17D to aid in positioning the ring 30D which incorporates a bevel 39D so that it can readily be inserted into member 20D.

Figure 5 shows a modification of the type of ring seal shown in Figure 3. Interior coacting sides 15E and 35E and exterior coacting sides 28E and 38E are oppositely inclined with respect to the pipe axis; therefore, the ring must be expanded so as to position it on the pipe end 10E. With suitable ring dimensions, it is possible to have the ring initially stressed after it has been forced on the pipe 10E. Thus, the inherent stresses in the ring can be made larger than the deforming stresses later set up in the pipe, and the ring will maintain a perfect seal, for no stress reversal or equalization can occur.

The same sealing principle could be used in a modified sealing ring (not shown) applied as is the one shown in Figure 4; however, the ring would have to be contracted, instead of expanded, in order to place it within the coupling end. This type of seal would be suitable for tubular members having high exterior stresses placed on the tubular walls.

From the sealing arrangements shown, it can be readily seen that as the members "10" and "20" are threaded together, the exterior and interior cylindrical sealing sides of the various sealing arrangements are pressed into intimate contact with the coacting tubular walls. If the sealing ring is made of a relatively soft metal, it will "creep" into the surface irregularities of the coacting tubular walls. Thus, a perfect seal will be obtained. The metal of which the seal will be composed is preferably such that it will have a greater elastic deformation than the strain set up in the surrounding pipe wall due to the weight of the pipe below or above it. Thus, the sealing action will be appreciably independent of the stress fluctuations in the pipe wall, and this will be particularly true if the cylindrical sealing sides are but slightly inclined to the axis of the pipe. Finally, if the coefficient of expansion of the ring metal is equal to or greater than that of the pipe metal, the effect of heat will be such as to aid the sealing action when the pipe is used in applications having a temperature above that normally encountered; likewise, the coefficient should be preferably smaller for the ring if the seal is to be used at low temperatures. In any case, a mathematical treatment of the ordinary dimensions of each design will reveal that the deformation produced by the ordinary range of temperature changes and stress reversals can easily be provided for by many metals on the market.

In Figure 6 there is disclosed a type of seal suitable for a pipe coupling. The pipe ends 40A and 50A are similar to each other; therefore, a complete description of but one of the ends will be made. The pipe end 40A has a threaded section 41A for engagement with the threaded section 61A of the pipe coupling 60A. The ring seal 70A has a side parallel to the internal surface 65A of the coupling against which the cylindrical exterior surface 75A of the ring seal 70A has an intimate contact. The corner 74A of the seal end 77A is broken or beveled so that the seal may easily be placed into the coupling 60A. After the ring seal is inserted into the coupling, the pipe 40A is tightly threaded into the position shown. The pipe 40A is provided with a bevel and a leading edge 44A to guide it into the ring seal 70A. When a seal is effected, the pipe surface 48A is in intimate contact with the ring seal surface 78₁A. These latter two surfaces may be inclined at any angle to the axis of the pipe; however, they are preferably inclined at the same angle as the taper of the threaded sections, or some greater angle, unless the threaded sections are not tapered in which case they should still be inclined at some small angle to the axis of the pipe. After the pipe 40A has been threaded into the coupling, the same procedure is followed with the pipe 50A, which has the surface 58A to coact with the ring sealing surface 78₂A. Thus a perfect seal is effected.

Where the friction between the seal and coupling is not large enough to prevent the ring from slipping as the member 40B is threaded into the coupling, a stop 69B may be provided on the modified type of sealing arrangement shown in Figure 9.

Figure 10:
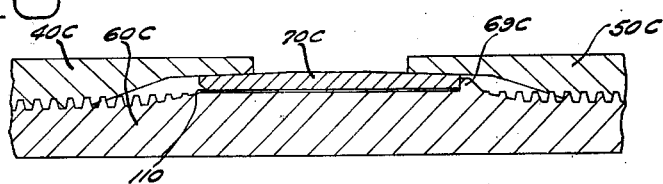

If a high tensile ring seal is to be used, a clearance 110, shown in the modified sealing arrangement of Figure 10, is provided to enable the seal 70C to "float" on the pipe ends. This type of seal is especially adaptable to pre-loading.

It can be seen that the sealing function of a coupling type seal is effected in the same manner as that for the seals shown in Figures 1, 2, 3, 4, and 5. The same mathematical and thermal relations still exist, and this type of seal may be regarded as an adaptation of the previous type.

The sealing arrangement shown in Figure 6 also involves the use of an end ring seal 80A between the members 60A and 40A; a similar seal would be placed between the members 60A and 50A. This arrangement would provide a sealing action at each end of the member 60A in addition to the sealing action of the ring seal 70A. Such a sealing arrangement could be used with the modified ring seals shown in Figures 9 and 10, for the central sealing ring is in no way affected by, nor does it interfere with the sealing function of the end seals; however, the use of end seals in conjunction with a central sealing ring is conducive to having a very rigid pipe joint.

The actual sealing action of the ring 80A is very similar to that effected by the sealing rings shown in Figures 1, 2, 3, 4, and 5. In fact, certain of these seals may be used as end seals. The ring 80A has a side 86A which coacts with the coupling side 66A' which is preferably normal to the axis of the pipe. The side 65A' of the coupling 60A is preferably parallel to the axis of the pipe and coacts with the ring side 85A. A bevel 89A is provided on the seal to aid in placing the seal in the annular recess provided by the coupling sides 65A' and 66A'. The ring side 87A is preferably at some acute angle to the axis of the pipe so as to provide a guiding action for the pipe end 44A. The actual end ring sealing function is provided by the surfaces 48A' and 88A of the pipe 40A and seal 80A, respectively. These surfaces are preferably inclined to the axis of the pipe at the same angle as the thread taper.

The arrangement is intended to be so proportioned that the sealing action will take place on both the end seal and the center seal simultaneously. The threaded sections of the coupling are merely intended to provide the necessary sealing and locking force. The chief advantage of this type of multiple sealing is the great rigidity of the joint and, in addition, the greater assurance that the joint will not leak due to the presence of a multiplicity of sealing rings.

Figure 8:
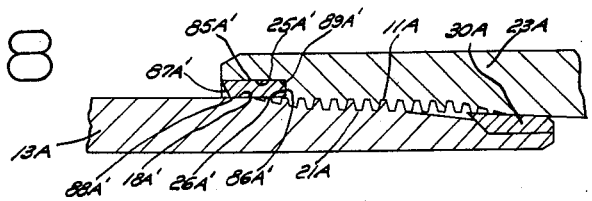

It should be appreciated that peripheral end seals need not be used in conjunction with a central coupling seal, which is quite capable of effecting a seal without their use; also, such end seals may be used in conjunction with seals for upset tubing, as is shown in Figure 8. Finally, only end seals alone can be used to seal either upset tubular member joints or coupling joints; however, this is not the standard practice.

The thread form of Figure 7 is deemed especially suitable for typical high pressure installations, for it provides an excellent locking action and is very easy to manufacture. The threaded assembly consists of a male thread 90A and an engaging female thread 100A, both of these threads having the same pipe taper. A clearance exists between the crest 91A of the thread 90A and the root 102A of the thread 100A; likewise, a clearance exists between the flank 93A and the flank 103A. The crest 101A of the thread 100A is also provided with a clearance from the root 92A of the male thread. The thread flanks 94A and 104A are in firm contact and provide the abutment for locking the threads together. The crests and roots of the threads are preferably parallel to the thread taper, while the flanks of the threads are inclined at a uniform angle to the taper; or, if it is desired, at a uniform angle to the axis of the pipe. The rounded bevels 95A and 105A are provided on the crests of the respective threads so as to aid in machining them and to aid in keeping the thread form from being damaged by relatively heavy blows usually encountered while the threaded members are being transported or when they are being "stabbed" together.

An inspection of the view will show that the presence of the crest and flank clearances greatly reduces the possibilities of "galling" and makes the thread independent of any sealing function whatsoever. The contacting thread flanks are used to provide the necessary sealing and locking force. By having the female crest and male root in abutment (not shown), there will be effected a very rigid threaded section which will reduce the stresses on both the pipe walls and the sealing surfaces proper. In using the end and center sealing arrangement of either Figure 6 or Figure 8, it is believed that this contact between the male root and female crest may be eliminated, providing a thread form similar to that illustrated in Figure 7, for the use of double seals will provide a very rigid joint without any thread action necessary to effect this.

Figure 11:
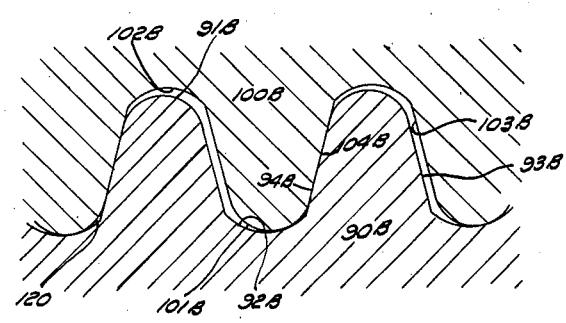

In Figure 11 is shown a view of a modified thread form. Here, the male thread 90B and female thread 100B have circular arc roots and crests, the respective parts being referred to with the same numbers as those of Figure 7 with the substitution of a "B" for the identifying character. While each of the crest and root arcs is located centrally with respect to its respective thread flanks, this condition need not be entirely adhered to, for a small degree of eccentricity would not be objectionable. However, with the preferred form, a good bearing contact is obtained between the male root 92B and the female crest 102B. Also, the use of centrally located circular arcs permits having a suitable clearance between the male crests and female roots, as is shown. Finally, the arcs of the female crest and male root are so proportioned that a clearance 120 exists between them. The limit of this proportioning would occur when the male root arcs would have infinite centers of curvature; that is, the root arcs would be straight lines; however, a better bearing is obtained by having relatively the same proportions as are shown.

It is obvious that the thread form shown in Figure 7 could be altered so as to incorporate circular arc roots and crests. And, with equal facility, many of the features disclosed in one of the views could be incorporated in any of the other views; therefore, I do not limit myself to the individual specific disclosures.

What I claim and desire to secure by United States Letters Patent is:

1. Means for sealing a tubular joint comprising a ring of relatively hard metal inserted into a recess in one of the joint members and having its exposed surfaces wedgingly contacting surfaces located on another of said joint members in such manner that in setting up the joint the ring metal is subjected to high elastic stresses which serve to maintain a seal regardless of slight movement between the joint members.

2. Means for sealing a tubular joint comprising a replaceable metallic ring inserted into a recess incorporated in the male member of said joint and having its exposed surfaces wedgingly contacting surfaces located on the female member of said joint in such manner that in setting up the joint the ring metal is subjected to high elastic stresses which serve to maintain a seal regardless of slight movement between the joint members.

3. Means for sealing a tubular joint comprising a replaceable metallic ring inserted into a recess incorporated in the female member of said joint and having its exposed surfaces wedgingly contacting surfaces located on the male member of said joint in such manner that in setting up the joint the ring metal is subjected to high elastic stresses which serve to maintain a seal regardless of slight movement between the joint members.

4. Means for sealing a tubular joint comprising a replaceable metallic ring inserted within a recess incorporated in the female member of said joint and having its exposed surfaces wedgingly contacting surfaces located on each of the two male members, which together with the said female member comprise the said joint, in such manner that in setting up the joint the ring metal is subjected to high elastic stresses which serve to maintain a seal regardless of slight movement between the joint members.

5. Means for sealing a tubular joint comprising a replaceable metallic ring inserted into a recess in one of the joint members and having its exposed surfaces wedgingly contacting surfaces located on another of said joint members in such manner that in setting up the joint the ring metal is subjected to high elastic stresses which serve to maintain a seal regardless of slight movement between the joint members; said ring being initially pre-loaded, during the process of inserting it into said recess, to such a degree that the inherent stresses resulting from the pre-loading act in opposition to and are constantly greater than any deforming stress which the ring experiences after the joint is set up.

6. Means for sealing a tubular joint comprising a plurality of replaceable metallic rings each of which is inserted into a recess in one of the joint members and each of which has its exposed surfaces wedgingly contacting surfaces located on another of said joint members in such manner that in setting up the joint the ring metal is subjected to high elastic stresses which serve to maintain a seal regardless of slight movement between the joint members; said rings being displaced from one another along the longitudinal axis of the joint.

CHARLES A. REIMSCHISSEL.